March 4, 1930.     B. M. SMALLEY     1,749,359
INSULATOR MOUNTING
Filed May 31, 1924
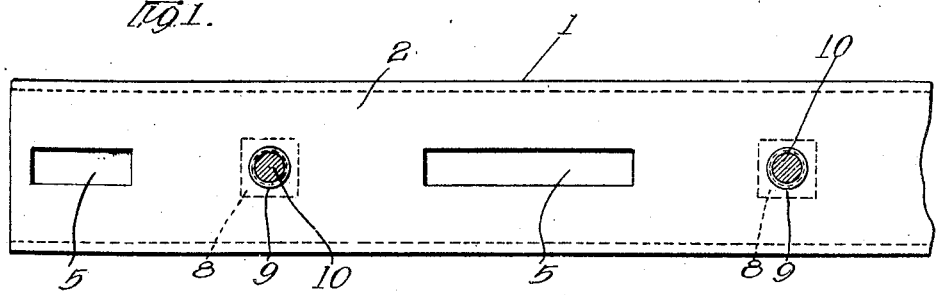
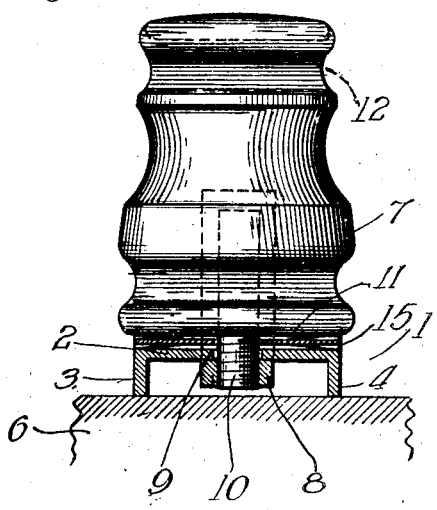
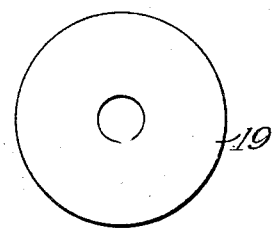
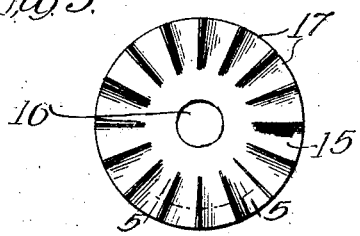
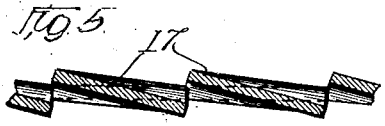
Inventor
Burton M. Smalley Patented Mar. 4, 1930

1,749,359

UNITED STATES PATENT OFFICE

BURTON M. SMALLEY, OF CHICAGO, ILLINOIS, ASSIGNOR TO JOSLYN MANUFACTURING & SUPPLY CO., OF CHICAGO, ILLINOIS, A CORPORATION OF ILLINOIS

INSULATOR MOUNTING

Application filed May 31, 1924. Serial No. 716,923.

My invention relates to mountings for insulators, and more particularly for racks which are adapted to be mounted in a substantially vertical position, although the invention is not limited to this type of service.

In supplying racks of this character, it is desirable to permit mounting of the base portion without the insulator, and then to attach the insulator after the base is firmly secured in place. Such procedure permits of freedom of the use of suitable attaching tools and eliminates danger of injury to the insulators proper while the base is being secured in place. Furthermore, it is desirable to ship or transport the base member separate from the insulator member proper, because of greater compactness and less danger of injury.

It is also desirable to be able to add additional insulators where the service requires, after the base is once installed.

According to my present invention, I provide a simple structure of rack and insulator which permits of this procedure.

In the preferred form of my invention, I provide a base member with a raised boss or channel-shaped portion, which raised boss or channel-shaped portion provides room for suitable attaching means which, in the preferred form, comprises a threaded nut spot-welded to the interior surface of the boss or base, and hence, rigidly secured in place and always available for attaching the insulator which has a threaded stud cemented thereinto, which stud may then be threaded through a hole in the base member into the attached nut.

Obviously, the stud might be welded to the base member and the nut mounted in the insulator, but such construction is not so advantageous, because the stud extending out from the base would be subject to injury and would be in the way, while the location of the nut inside of the hollow part of the base in nowise interferes with the attaching of the base to the supporting surface, nor are the threads subject to injury.

In order to acquaint those skilled in the art with the manner of constructing and operating a device according to my invention, I shall now describe in connection with the accompanying drawings a specific embodiment of the invention.

In the accompanying drawings,

Fig. 1 is a plan view of a base member showing the attaching studs in section;

Fig. 2 is a section through the base member showing the stud connected to the nut with the interposed yielding washer;

Fig. 3 is a plan view of the yielding washer adapted to be interposed between the base of the insulator and the face of the base member;

Fig. 4 is a plan view of a modified form of yielding washer;

Fig. 5 is a fragmentary view of the yielding washer taken on line 5—5 of Fig. 3.

The base 1, shown in Figs. 1 and 2, comprises an inverted channel-shaped member which is preferably made of a strip of heavy sheet metal. If desired, lateral flanges may be extended from the lower edges of the legs or sides 3 and 4 parallel to the top 2. In such case, suitable bolt holes may be formed in the top, as indicated at 5, or in the laterally extending flanges if so desired, or in both. The purpose of the longitudinal channel is, first, to form a rigid supporting member for the insulator, and, second, to provide the raised surface or top portion 2 with space beneath the same, and a suitable supporting surface such as indicated at 6 in Fig. 2, for housing suitable attaching means for the insulator 7, which attaching means in the present case comprises a threaded nut 8 which is welded against the inner side of the top portion 2 with its threaded opening in register with an opening 9 in the wall 2. The insulator 7 has a suitable bolt or stud 10 cemented in a recess in the bottom of the same. This insulator 7 has a substantially flat bearing base 11 adapted to cooperate with the flat surface of the top wall 2 so as to secure a firm and even support all around of relatively extended area.

Where an apertured insulator, such as the one shown, is employed, it is desirable to align the aperture 12 with the run of the conductors, and it is necessary, therefore, that some means be provided for permitting the insulator to be drawn up tight by threading the lower end 10 through the nut 8 to draw up the insulator and yet permit angular adjustment of the same without either subjecting the part to excessive strain or causing the attachment to be too loose.

In order to accomplish this desirable result, I provide a yielding washer 15, shown in Fig. 3.

This washer, as shown in Figs. 2 and 3, comprises a disc of spring stock, having a central opening 16 adapted to permit the stud or bolt 10 to pass therethrough, and having its peripheral surface slitted on radial lines to provide a plurality of sectors. These sectors are twisted to have a lay or inclination with respect to the original plane of the disc, this lay providing sufficient yield to permit adjustment of the insulator through substantially less than 180 degrees after the insulator is once drawn up tight. The lay of the sectors 17 is in such a direction that the edges freely permit the base surface 11 of the insulator 7 to slide thereover for tightening of the same, but tend to act as locking means against its retrograde motion.

Quite obviously, the yielding washer may be made up otherwise than as indicated, and, for example, a yielding washer 19 made of rubber, leather, or fabric, may be provided instead, so long as it has sufficient yield to permit of the adjustment of the insulator 7 in an angular direction. At the same time, any irregularities of the base surface 11 or the top surface of the wall 2 will be taken up by this yielding washer and a firm and extended bearing for the insulator 7 will be provided.

The manner of mounting the stud or bolt 10 in the insulator 7 is not of the essence of the invention.

I have indicated in dotted lines in Fig. 2 how the stud 10 is cemented into a longitudinally extending recess which lies below the transverse aperture 12. It may be accomplished in any desired manner, and is well understood by those skilled in the art. The particular form of the insulator 7 is not of the essence of the invention. It is, however, preferred that the base surface 11 of the insulator be flat and of extensive area, so as to secure a good firm mounting on the base wall 2.

I do not intend to be limited to the details shown or described.

I claim:—

1. In combination, a base member having a flat wall, depending flanges for spacing said wall from a supporting surface, said wall having an aperture, a threaded nut secured to the inside surface of the wall in line with the opening, an insulator having a threaded stud centrally attached fixedly thereto, said stud being adapted to thread into said nut, and a yielding washer between the base of the insulator and the outer surface of the wall.

2. In combination, a sheet metal wall, depending flanges supporting said wall from a supporting surface, said wall having openings therethrough, threaded nuts integrally secured to the inside wall in line with said openings, insulators having flat base portions and having axial studs fixedly secured thereto, said studs being threaded to cooperate with the threaded nuts, and yielding washers between the bases of the insulators and the said wall.

3. In combination, a base member having a flat seating surface for an insulator, said seating surface having a central aperture, screw threads about said aperture, a transversely perforated insulator having a cooperating flat base and having a threaded stud fixedly secured centrally thereof and adapted to cooperate with the threads of the base, and a yielding washer between the base of the insulator and said base member to permit of angular adjustment of the insulator with respect to said base.

4. In combination, a channel bar having slots for mounting bolts to mount the channel in inverted position upon a supporting surface which closes the channel, said bar having holes through the base for receiving studs, nuts secured to the inside of the channel in register with said holes, transversely perforated insulators, threaded studs fixed axially in the lower ends of said insulators below said perforations and projecting from the bases thereof, said studs being threaded into the nuts by turning of the insulators, and spring means for holding the insulators in any desired angular position.

5. In combination, a base member having a flat face with a threaded socket therein, an insulator having a head and a flat base, said head having a transverse perforation therethrough, said insulator having a threaded stud secured thereto below said perforation and projecting axially from the base thereof, the stud being secured to the threaded socket by turning of the insulator on its axis, and spring means lying between the base member and the base of the insulator for holding the insulator in any selected angular position.

6. In combination, a base member having a flat face with a threaded socket disposed centrally therein, an insulator having a head and a base, the head having a transverse perforation, the base having an axial longitudinal recess therein below the head, a stud member having one end rigidly secured in said recess and its other end projecting below the base, and adapted to be threaded into said socket by turning of the entire insulator and stud, and a circular symmetrical spring plate between the base of the insulator and the base member for supporting the base of the insulator in any desired angular position even though such turning of the stud raises the entire insulator from the base member.

In witness whereof, I hereunto subscribe my name this 28th day of May, 1924.

BURTON M. SMALLEY.